United States Patent
Bannister

(10) Patent No.: US 6,263,455 B1
(45) Date of Patent: Jul. 17, 2001

(54) METHOD AND APPARATUS FOR ANALYZING ALARM CONDITIONS IN A NETWORKED COMPUTING ENVIRONMENT

(75) Inventor: William J. Bannister, Alpharetta, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/186,468

(22) Filed: Nov. 5, 1998

(51) Int. Cl.[7] ............................. G08B 1/08; G08B 23/00
(52) U.S. Cl. ................................................ 714/25; 714/38
(58) Field of Search ............................. 714/25, 38, 47; 710/15; 379/1, 33; 370/241, 242

(56) References Cited

U.S. PATENT DOCUMENTS

| | | |
|---|---|---|
| 5,309,448 | 5/1994 | Bouloutas et al. .................. 371/29.1 |
| 5,388,189 | 2/1995 | Kung ....................................... 395/50 |
| 5,398,277 | 3/1995 | Martin, Jr. et al. ..................... 379/39 |
| 5,473,596 | 12/1995 | Garafola et al. ........................ 370/13 |
| 5,495,470 | 2/1996 | Tyburski et al. ........................ 370/14 |
| 5,646,864 | 7/1997 | Whitney ................................ 364/514 |
| 5,677,945 | * 10/1997 | Mullins et al. . |
| 5,748,079 | * 5/1998 | Addy . |
| 5,960,326 | * 9/1999 | Kido . |

\* cited by examiner

*Primary Examiner*—Gopal C. Ray

(57) ABSTRACT

Alarm messages for a networked computing environment having multiple elements are analyzed. An alarm message from at least one element of the networked computing environment is received. The received alarm message parsed into a set of segments including a variable text segment. The variable text segment is categorized into a set of tokens. The alarm message is consolidated into an alarm table based on the set of tokens.

19 Claims, 7 Drawing Sheets

| 300 | 310 | 320 | 330 |
|---|---|---|---|
| DATE | TIME | SOURCE | VARIABLE TEXT |
| 07/22/97 | 12:30 | XYZ | inetd: 0 running, should be 1 |
| 07/22/97 | 12:35 | ABC | Unable to send 10 files to XYZ |
| 07/22/97 | 12:47 | XYZ | Host XYZ offline, unable to connect on port 1987 |
| 07/22/97 | 12:55 | ABC | Unable to send 51 files to XYZ |
| 07/22/97 | 18:35 | MNO | /dev/diskslice1: only 5% free blocks remaining |
| 07/22/97 | 18:45 | MNO | /dev/diskslice1: only 3% free blocks remaining |
| 07/23/97 | 05:21 | HIJ | /dev/diskslice2: only 3% free blocks remaining |
| 07/22/97 | 18:55 | MNO | uf_alloc: no space left on /dev/diskslice |

*FIG. 3*

| DATE | MESSAGE COUNT | EVENT COUNT | SOURCE COUNT | MESSAGE TEXT |
|---|---|---|---|---|
| _T_ | 3 | 2 | 2 | \\/dev/diskslice1\\: only \\3%\\ free blocks remaining |
| _T_ | 2 | 1 | 1 | Unable to send \\10\\ files to XYZ |
| _T_ | 1 | 1 | 1 | inetd: 0 running, should be 1 |
| _T_ | 1 | 1 | 1 | Host XYZ offline, unable to connect on port 1987 |
| _T_ | 1 | 1 | 1 | uf_alloc: no space left on \\/dev/diskslice\\ |

*FIG. 7*

METHOD AND APPARATUS FOR ANALYZING ALARM CONDITIONS IN A NETWORKED COMPUTING ENVIRONMENT

FIELD OF THE INVENTION

The present invention relates to supervising a networked computer environment. More specifically, the present invention relates to analyzing alarm conditions in a networked computer environment, such as a communications network.

BACKGROUND

A networked computer environment typically comprises multiple interconnected elements, such as UNIX® and Windows NT® platforms. As real or potential problems occur with these networked computer elements, alarm messages are generated and sent to a centralized operations system(s) within the network for analysis. Alarm message can be, for example, generated autonomously by the affected element or generated in response to queries.

Upon receiving alarm messages, the alarm messages typically are displayed to at least one system operator. The system operator then interprets the alarm messages, isolates the corresponding event causing the alarm within the environment and resolves the event, all within the shortest time possible. The system operator can then consider the next alarm message.

Some types of networked computing problems, however, can generate multiple alarm messages for a single event. In such situations, the system operator may not be able to determine which alarm messages are associated with single networked computing events; the system operator can be overwhelmed by the high number of seemingly unrelated alarm messages. Due to varying levels of operator experience in dealing with networked computing problems, the problems can go undiagnosed or improperly diagnosed, and more time than is necessary elapses to solve the problems. Such delays can result in a costly waste of networked computing resources and availability.

Efficiency can be improved by automating a process by which related alarm messages are correlated to identify particular networked computing problems. For example, U.S. Pat. No. 5,388,189 by Kung and issued on Feb. 7, 1995 uses an expert system having a flow-chart-based knowledge representation scheme with a user interface and inference engine. The Kung system, however, suffers the shortcoming that is a very complex and expensive to implement.

SUMMARY OF THE INVENTION

Alarm messages for a networked computing environment are analyzed. An alarm message from at least one element of the networked computing environment is received at an alarms collector. The received alarm message is parsed into a set of segments including a variable text segment. The variable text segment is categorized into a set of tokens. The alarm message is consolidated into an alarm table based on the set of tokens.

In one embodiment of the present invention, the set of segments can include a date segment having an alarm date, a time segment having an alarm time and an element segment having an element identifier. The alarm message can be consolidated based on the alarm date, the alarm time and the element identifier.

In another embodiment of the present invention, the alarm messages can be consolidated by grouping the alarm message with an entry from the alarm table when the tokens of the alarm messages match the tokens of the entry within a minimum-match threshold and by incrementing a message count associated with the entry. Additionally, the alarm messages can be consolidated by an event count per element associated with the entry when an alarm time associated with the alarm message is within a time threshold of a entry time associated with the entry.

In another embodiment of the present invention, categorizing the variable text segment into tokens can include the substeps of removing a container byte from the leading byte of each token and/or removing a container byte from the trailing byte of each token. In other words, the alarm message tokens can be loosely typecast by removing container bytes from the leading byte and/or trailing byte of each token. The alarm message tokens can then be categorized with each token having a type from the group of alphabetic, numeric, alphanumeric and other.

BRIEF DESCRIPTION OF THE DRAWINGS

FIG. 3 shows an exemplary list of received alarm messages, according to an embodiment of the present invention.

FIG. 7 illustrates a configuration of a consolidated alarm message report corresponding to the list of received alarm messages shown in FIG. 3, according to an embodiment of the present invention.

DETAILED DESCRIPTION

Alarm messages for a networked computing environment are analyzed, for example, after the messages have been generated by an element and received by a centralized alarms collector. An alarm message from at least one element of the networked computing environment is received at a alarms collector. The received alarm message parsed into a set of segments including a variable text segment. The variable text segment is categorized into a set of tokens. The alarm message is consolidated into an alarm table based on the set of tokens.

The term "element" when referred to in conjunction with a networked computing environment is used herein to include, but is not limited to, system components of the network computing environment that can generate alarm messages. In addition, these system components are sometimes referred to herein as "nodes" of the networked computing environment and as "sources" of alarm messages.

The term "token" is used herein to include, but is not limited to, a segment of discrete text portions where the segment is categorized by the type of text within the segment. The term "categorizing" is used herein to include, but is not limited to, the acts of separating text into one or more segments of discrete text portions (i.e., tokens) and then classifying a segment of discrete text portion into a type of class. For example, tokens can be categorized as alphabetic, numeric, alphanumeric, or other classes.

The present invention provides a cost-effective method and apparatus for analyzing alarm messages. The method requires no pre-loading of data specific to the alarm text.

Figure 1:
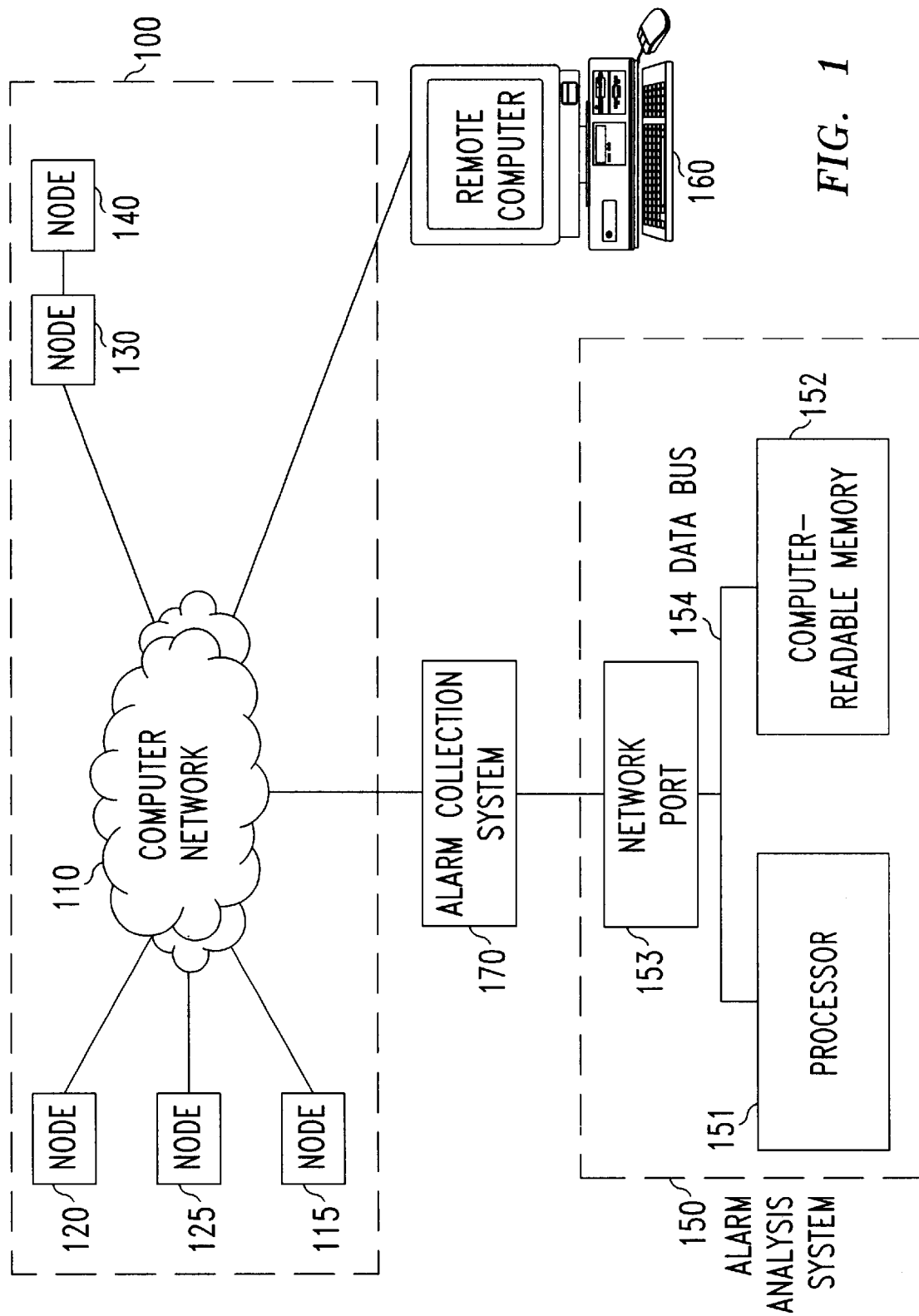
FIG. 1 illustrates an alarm analysis system within a networked computing environment, according to an embodiment of the present invention.

FIG. 1 illustrates an alarm analysis system within a networked computing environment, according to an embodiment of the present invention.

Networked computer environment 100 can include, for example, networked computing nodes 115, 120, 125, 130 and 140 connected through computer network 110. The networked computer environment 100 can include, for example, client/server equipment, a mainframe computer connected to terminals, or even telecommunication switches connected to communication devices through a communication network. Networked computing nodes 115 through 140 can be any of a variety of types of elements appropriate for the networked computer environment 100. For example, where the networked computer environment 100 includes client/server equipment, the nodes can include for example a UNIX® server, a Windows NT® server, a Windows NT® client, and/or a HP client, as appropriate. Where the networked computer environment 100 includes telecommunication network equipment, the nodes can include for example routers, hubs, and/or switches such as the AT&T 4ESS® and/or the Lucent Technologies 5ESS®.

Alarm analysis system 150 can be connected to networked computing environment 100, for example, by computer network 110. Remote computer 160 is also connected to communication network 100, for example, by computer network 110.

Networked computing nodes 120, 125 and 130, as well as any other additional elements (not shown) within communication network 110 can generate alarm messages when an error or potential problem has occurred in that element. These alarm messages can be sent through communication network 110 to alarm analysis system 150.

Alarm analysis system 150 is any type of adjunct platform comprising the hardware and software appropriate to operate the necessary alarm analysis functions. Alarm analysis system 150 can comprise processor 151, computer-readable memory 152, network port 153 and data bus 154. Network port 153 can be connected to communication network 110. Data bus 154 connects processor 151, computer-readable memory 152, and network port 153. Computer-readable memory 152 can store a table containing recent alarms. For example, the alarm analysis system 150 can use the Hewlett Packard's IT/Operations.

Alarm analysis system 150 can analyze the alarm messages by consolidating similar and/or related messages, and by presenting these consolidated results to an analyst, as discussed below in connection with FIGS. 2 through 6.

The analyst can be located, for example, at remote computer 160. Remote computer 160 can have specialized software for fetching the consolidated results from alarm analysis system 150 and presenting these results to the analyst. For example, remote computer 160 can include Navigator® by Netscape Communications to fetch and display the consolidated results.

Although FIG. 1 only shows networked computing nodes 115, 120, 125, 130 and 140, and alarm analysis system 150 connected to communication network 110, any number of additional networked computing nodes (such as communication devices and/or switches) and/or alarm analysis systems can be connected to communication network 110.

Figure 2:
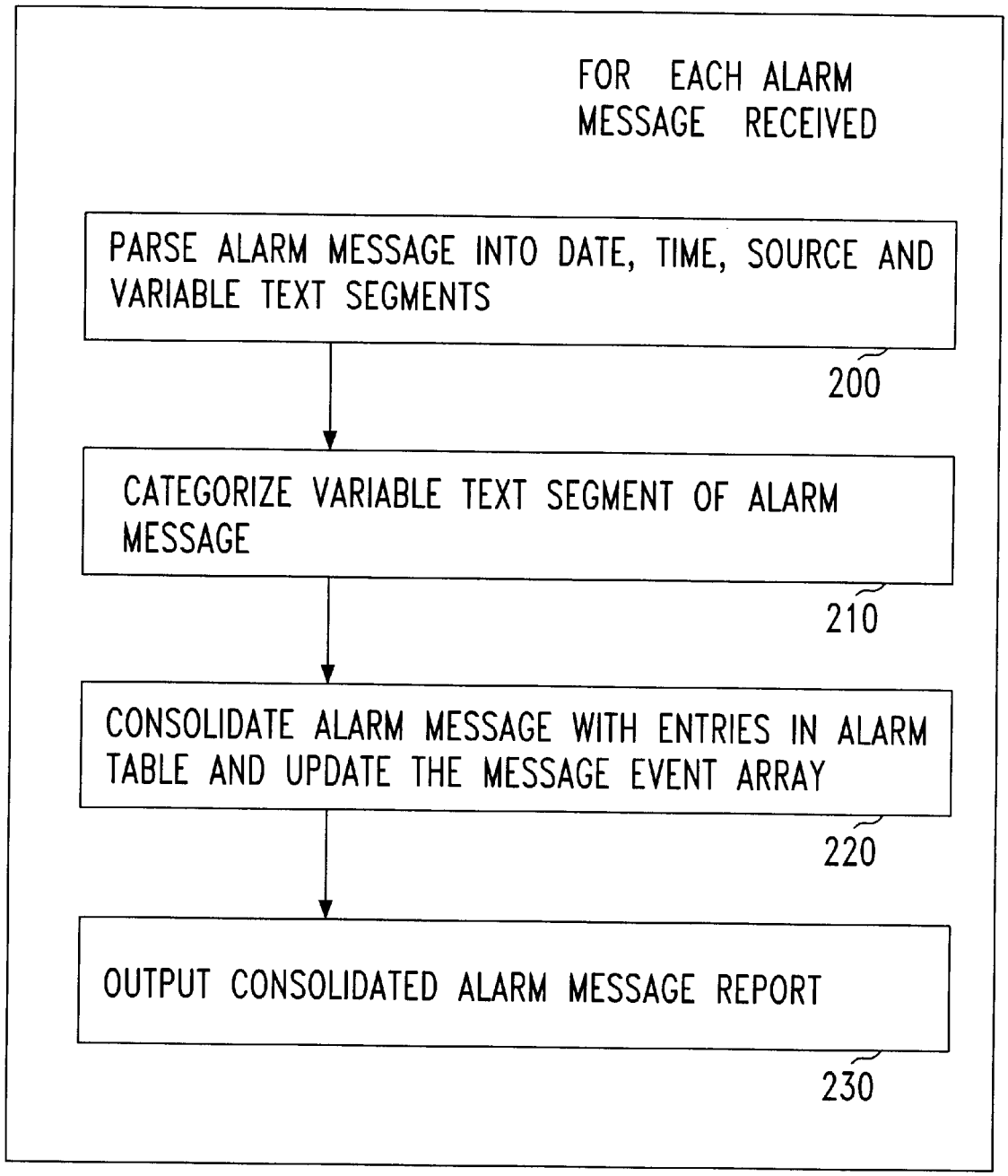
FIG. 2 illustrates the procedure for analyzing alarm messages to be performed by the alarm analysis system, according to an embodiment of the present invention.

FIG. 2 illustrates the procedure for analyzing alarm messages to be performed by the alarm analysis system, according to an embodiment of the present invention. As shown in FIG. 2, steps 200 through 230 are repeated for each alarm message received by alarm analysis system 150.

At step 210, alarm analysis system 150 parses the each received alarm message into segments. For example, alarm analysis system 150 can parse each received alarm message into the following four segments: a date segment, a time segment, a source segment, and a variable text segment. FIG. 3 shows an exemplary list of received alarm messages, according to an embodiment of the present invention. The list shows that each alarm message includes the following segments: date 300, time 310, source 320, and variable text 330. For example, the first message shown in FIG. 3, has the following values: "7/22/97" in date segment 300, "12:30" in time segment 310, "XYZ" in source segment 320, and "inetd: 0 running, should be 1" in variable text segment 330.

Figure 4:
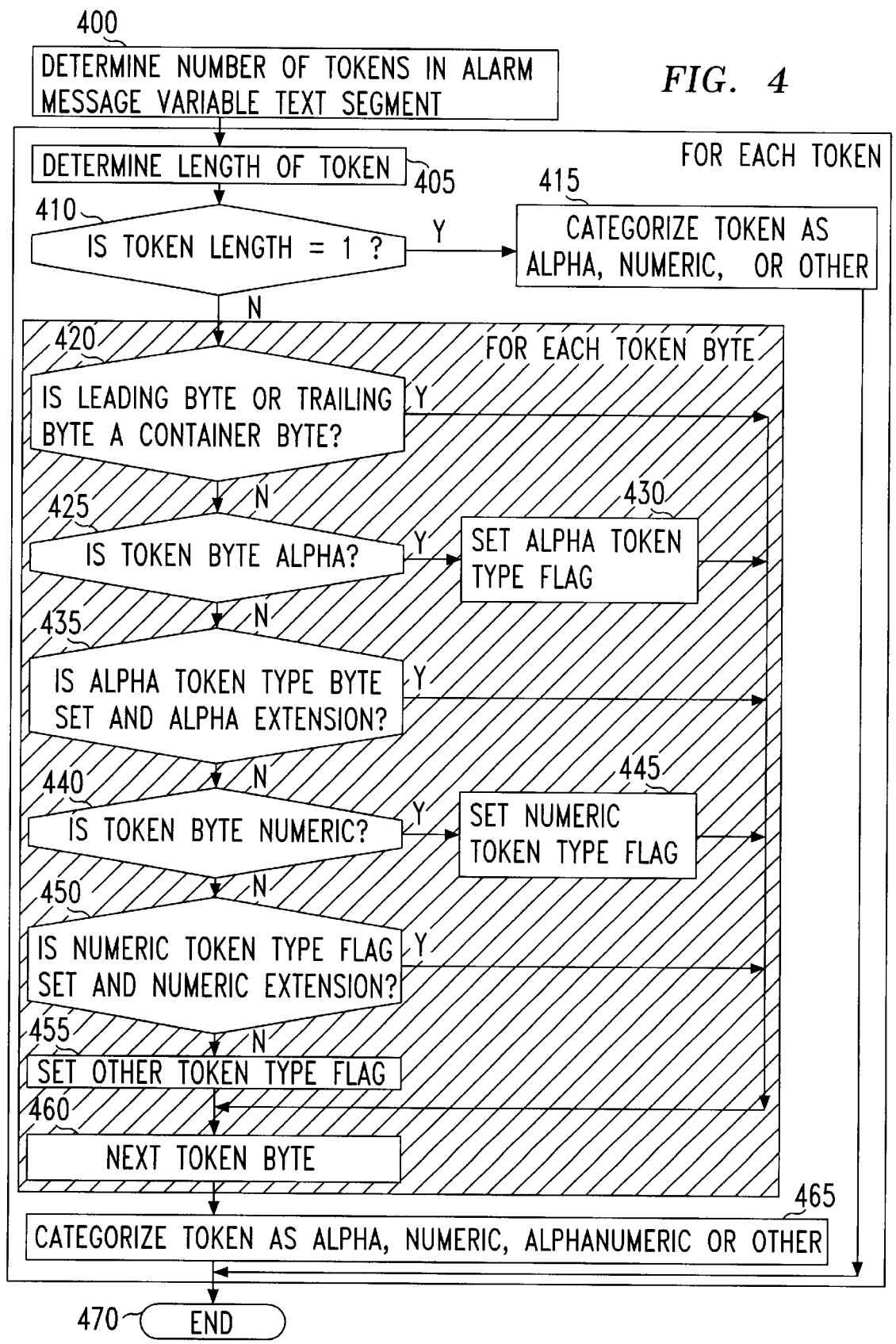
FIG. 4 illustrates a flowchart by which the variable text segments of a received alarm message can be categorized according to an embodiment of the present invention.

In step 210, variable text segment 330 of each received alarm message is categorized. In other words, the variable text segment of the alarm message contains multiple discrete text portions; each of the discrete text portions of the variable text segment is identified and separated into distinct tokens. Tokens are then categorized. Tokens can be categorized as alphabetic, numeric, alphanumeric, or other classes. FIG. 4 illustrates a flowchart by which the variable text segments of a received alarm message can be categorized, according to an embodiment of the present invention.

At step 400, the number of tokens in the variable text segment is determined. Steps 405 through 465 are performed for each token in the variable text segment. At step 405, the length of the token is determined. At conditional step 410, the token length is evaluated to determine whether the token length is equal to one byte. If the token length is equal to one byte, the process proceeds to step 415 where the one-byte token is categorized as alphabetic, numeric, alphanumeric, or other. In other words, if the single byte of the token is a alphabetic character such as "a" through "z" or "A" through "Z", then the token is categorized as alphabetic. If the one byte token is a number, for example "0" through "9", then the token is categorized as numeric. If the token has a value other than alphabetic or numeric, such as "$", "%", "[", "]", "?", then the token is categorized as "other". The process then proceeds to step 470 where the process described by FIG. 4 ends.

Returning to step 410, if the token does not have a length of one byte, then the process proceeds to conditional step 420. Steps 420 through 460 are repeated for each token byte in the token. For example, if there are four bytes in the token, then steps 420 through 460 are repeated four times.

At step 420, the leading byte and trailing byte are evaluated. If the leading byte has the value of a container byte (e.g., "'", """, "\", "{", "[", "(") then the process proceeds to step 460. Similarly, if the trailing byte is a container byte (e.g., "'", "\", """, "}", "]", ")", ".", ":", ";", "!", "?") then the process proceeds to 460. At step 460, the counter associated with marking which token byte is being evaluated is incremented so that the process returns to step 420 to perform steps 420 through 460 for the next token. This, of course, presumes that there are additional bytes in the token to be evaluated; if no token bytes remain, then the process proceeds to step 465.

Returning to conditional step 420, if the leading byte or trailing byte is not a container byte, then the process proceeds to conditional step 425. At step 425, the token byte is evaluated to determine whether it is an alphabetic byte. If the token byte is an alphabetic byte, then an alpha-token-type flag is set. In other words, by setting the alpha-token-type flag, this flag indicates that the token byte being evaluated has at least one alphabetic character. The process then proceeds to step 460. If the token byte being evaluated in conditional step 425 is not alphabetic, then the process proceeds to conditional step 435.

At conditional step 435, if the alpha-token-type flag is set and the current token byte has a value of an alphabetic extension, then the process proceeds to step 460. An alphabetic extension can be, for example, an "'" (i.e., an apostrophe) thereby indicating that the particular token should still be evaluated as an alphabetic token, even though a non-alphabetic character exists within the token. At conditional step 435, if the alpha-token-type flag is not set or the current token byte does not have an alphabetic extension, then the process proceeds to conditional step 440.

At conditional step 440, if the current token byte has a numeric value, then the process proceeds to step 445. At step 445, the numeric-token-type flag is set and the process proceeds to step 460. At conditional step 440, if the current token byte does not have a numeric value then the process proceeds to conditional step 450.

At conditional step 450, if the numeric-token-type flag is set, and the current token byte has a value of a numeric extension, then the process proceeds to step 460. A numeric extension can be, for example, ".", ",", ":", or "%", thereby indicating that the current token should still be evaluated as numeric, even though non-numeric characters exist within the token. For example, "1.2", "1,000", "1:3", and "50%" are all examples of tokens that should be evaluated as numeric even though non-numeric characters exist within that token. At conditional step 450, if the numeric-token-type flag is not set or the current token byte does not have a numeric extension, then the process proceeds to step 455.

At step 455, the other-token-type flag is set. This indicates that the token has at least one byte which is not numeric and is not alphabetic. At step 460, the counter indicating which token byte is being evaluated is incremented.

At step 465, the current token is categorized as alphabetic, numeric, alphanumeric, or other. For example, a token having been evaluated by steps 405 through 460 where the alpha-token-type flag is set but the numeric-token-type flag and the other-token-type flag are not set indicates that the current token is alphabetic. Similarly, if the current token has been evaluated by steps 405 through 460, and only the numeric-token-type flag is set, then the current token is categorized as a numeric. If the current token has been evaluated and both the alpha-token-type flag and the numeric-token-type flag have been set, then the current token is categorized as an alphanumeric. Finally, if the current token has been assessed by steps 405 through 460 has the other-token-type flag set, then the current token should be categorized as a "other". At step 470, the process described in reference to FIG. 4 ends, then the process returns to the process described in FIG. 2 at step 220. In other words, FIG. 4 represents a portion of the process associated with step 210 shown in FIG. 2.

Figure 5:
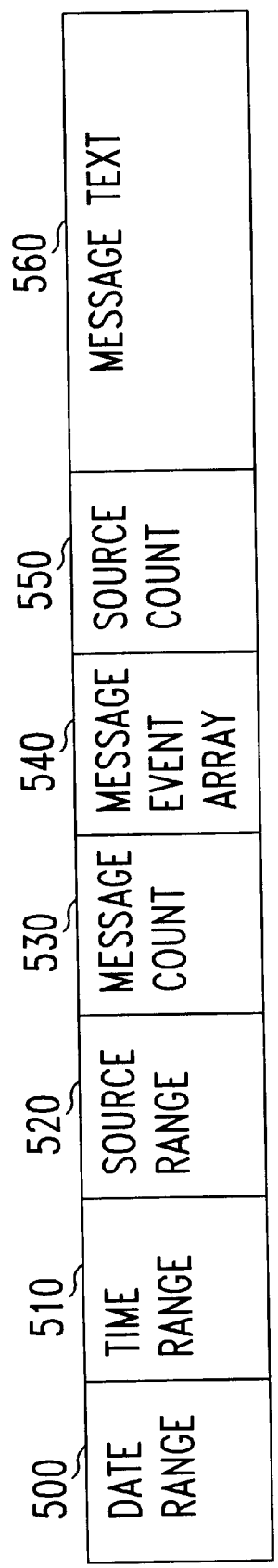
FIG. 5 shows the format of an alarm table, according to an embodiment of the present invention.

Returning to FIG. 2, at step 220, each received alarm message is consolidated with the existing table entries in the alarm table and the associated message event array within the alarm table is updated. FIG. 5 shows the format of an alarm table, according to an embodiment of the present invention.

An alarm table can include, for example, the following fields for each table entry: date range 500, time range 510, source range 520, message count 530, message event array 540, source count 550 and message text 550. Date range 500 indicates the alarm occurrence dates associated with the table entry for previously received alarm messages. Time range 510 indicates the alarm occurrence times of previously received alarm messages associated with the table entry. Source range 520 indicates the sources of previously received alarm messages associated with the table entry. Message count 530 indicates the number of alarm messages previously received in association with the table entry. The message event array 540 is an array which indicates an event count (i.e., the number of previously received alarm messages associated with the table entry having alarm occurrence times within a user-specified time range) and the associated sources that produced the alarm. Source count 550 indicates the number of sources that generated the previously received alarm messages associated with the table entry. Message text 560 corresponds to the tokens of variable text segment of previously received alarm messages associated with the table entry; each token in message text 560 has a token-type identifier identifying whether the token is alphabetic, numeric, alphanumeric or other.

Each received alarm message is consolidated with an existing table entry in the alarm table by matching the token of the alarm message's variable text with the tokens of the alarm table entry's message text. Alarm messages are matched with the alarm table entry(s) in the sense that if a user-specified percentage, referred herein as the minimum-match threshold, is satisfied, then the alarm message is consolidated with that alarm table entry.

Figure 6:
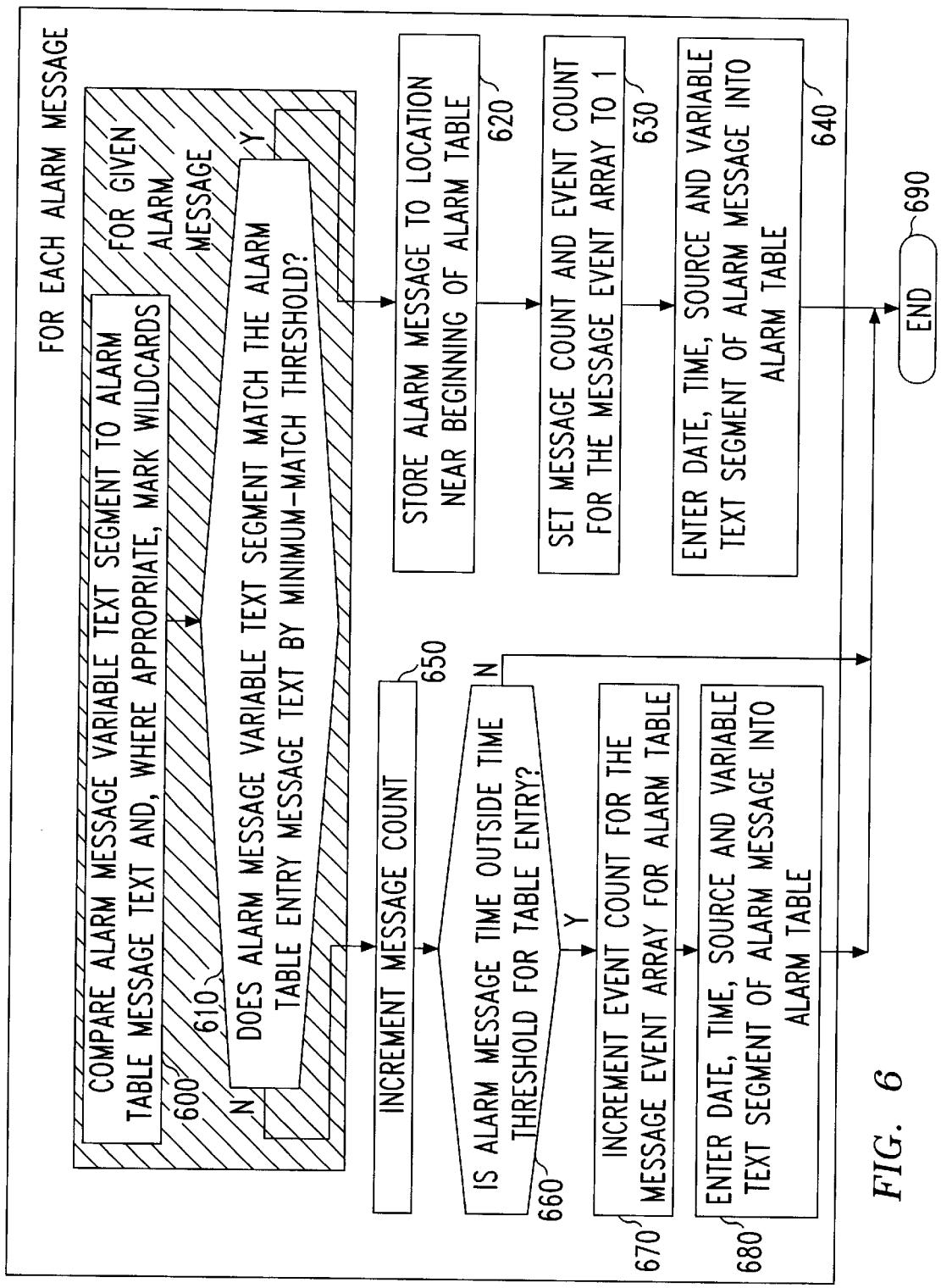
FIG. 6 is a flowchart illustrating a process for consolidating received alarm messages with an entry in the alarm table, according to the embodiment of the current invention.

FIG. 6 is a flowchart illustrating a process for consolidating received alarm messages with an entry in the alarm table, according to the embodiment of the current invention. The term "consolidating" is used herein interchangeably with the term "grouping".

Note that steps 600 through 690 of FIG. 6 are performed for each received alarm message. Note also that steps 600 and 610 are repeated for a given alarm message until a match is found within the alarm table or the entire alarm table has been searched.

At step 600, the variable text segment of the received alarm message is compared to message text 560 of an entry in the alarm table entry and, where appropriate, token differences between the two are marked as wildcards. Wildcard tokens can be embodied, for example, as a token matching any other token. The comparison of the received alarm message and the alarm table entry includes verifying that each has the same number of tokens and comparing like token types and lengths.

At conditional step 610, if the variable text segment of the alarm message matches the table entry by a minimum-match threshold, then the process proceeds to step 620. If the variable text segment of the alarm message does not match the table entry by the minimum-match threshold, then the process proceeds to step 650. The minimum-match threshold can be user specified. For example, the minimum-match threshold can have a value of 75%; in such a case, if the variable text segment of the alarm message has 75% of its characters matching the table entry, then the process would proceed to step 650; otherwise, the process would proceed to step 620. In an alternative embodiment, the minimum-match threshold is used on a per token basis. In other words, if the an alarm message token does not match an alarm table entry token by the minimum-match threshold, then the process would proceed to step 650; otherwise, the process would proceed to step 620.

At step 620, the received alarm message without wildcards is stored to a location near the beginning of the alarm table. This, of course, indicates that the current alarm message does not match any of the existing alarm table entries and, consequently, constitutes an additional entry for the table. The previous entry at the front of the alarm table is moved to the end of the alarm table.

At step 630, message count 530 and the event count of message event array 540 associated with the newly entered alarm message are set to 1. At step 640, the date, time, source, and variable text segment of the received alarm message are entered into date range 500, time range 510 source range 520 and message text 560, respectively. At step 690, the process ends.

At step 650, where the alarm message's variable text segment matches the table entry by a minimum-match threshold, message count 530 for the particular table entry is incremented by one. Depending on the location of the entry matched in the alarm table, the entry will be exchanged with an entry near the front of the alarm table.

The location of "near the front" is found by determining the ordinal slot value for the table entry matched, right shifting the value N times, checking the resultant value for a non zero result and then and'ing the resultant value with a bit mask, $2^N-1$, that represents the slots in the front of the table available for selection. "N" is selected so that the normal processing will have a table of length 4N.

At conditional step 660, date 300 and time 310 of the alarm message is compared to date range 500 and time range 520, respectively, for the matched alarm table entry. If date 300 and time 310 are not outside a time threshold for the alarm table entry, then the process proceeds to step 690. If date 300 and time 310 are outside the time threshold for the table entry, then the process proceeds to step 670. The time threshold can be user specified. For example, the user can specify a time threshold of ten minutes; in such a case, alarm messages received more than ten minutes apart are considered to be related to two separate alarm events.

At step 670, the event count of the message event array 540 for that alarm table entry is incremented by one. At step 680, the date, time, source, and variable text segment of the received alarm message are entered into date range 500, time range 510 source range 520 and message text 560, respectively. The process then proceeds to step 690. At step 690, the process ends.

Returning to FIG. 2, at step 230, a consolidated alarm message report is output to a user of the alarm analysis system. The consolidated alarm message report can present to the alarm analyst substantially fewer alarm messages than initially would otherwise be reported to alarm analysis system 150.

FIG. 7 illustrates a configuration of a consolidated alarm message report corresponding to the list of received alarm messages shown in FIG. 3, according to an embodiment of the present invention. The table includes the following fields: date 700, message count 710, event count 720, source count 730, and message text 740. Date 700 indicates the day of the week at which the alarm or alarms for a particular table entry occurred. Message count 700 indicates the number of alarm messages received of the same type for that particular table entry. Event count 720 indicates the number of alarm messages received from the same source occurring within a specified time period corresponding to the time threshold. Source count 730 indicates the number of sources associated with a particular table entry. For example, the number of sources associated with a particular table entry can be clickable to expand to a list of the sources and their associated message counts. Message text 740 corresponds to the variable text segment of alarm messages potentially including wild card values. For example, the text that is common to all the alarm messages can be displayed in black while the wild card fields of the alarm messages can be displayed in color and in italics.

The consolidated alarm message report shown in FIG. 7 corresponds to the list of received alarm messages shown in FIG. 3. For example, the second and fourth alarm messages listed in FIG. 3 are consolidated into the second entry of the consolidated alarm message report shown in FIG. 7. Following this example, the value "2" of message count 710 for the second consolidated report entry indicates that this entry represents two alarm messages. The value "T" of date 700 indicates that the alarm messages occurred on Tuesday. The value "1" of event count 720 indicates that the alarm messages represents the occurrence of one distinct alarm. The value "1" of source count 730 indicates that the alarm messages originated from one source. The values "Unable to send \10\ files to xyz" of message text 740 indicates that the alarm messages had the same message text except for the portion represented by the wildcard "\10\".

As FIG. 7 illustrates, the alarm analysis system can consolidate alarm messages so that the alarm analyst can interpret the information in a substantially simpler form. Rather than analyzing several alarm messages to supervise elements of a communication network, the alarm analyst need only analyze a reduced set of alarm messages to supervise the elements of the communication network.

It should, of course, be understood that while the present invention has been described in reference to a particular system configuration and process, other system configurations and processes should be apparent to those of ordinary skill in the art. For example, the present invention can operate with any number of networked computing nodes (such as communication devices, service provider platforms, service provisioning systems, billing platforms and payment system platforms), and be connected to a communication network or combination of communication networks. Similarly, the formats of the received alarm messages, the alarm table and the consolidated alarm message report can vary appropriately.

What is claimed is:

1. A method for analyzing alarm messages for a networked computing environment having a plurality of elements, comprising:
   (a) receiving a plurality of alarm messages from at least one element of the networked computing environment;
   (b) parsing each alarm message received in said step (a) into a plurality of segments including a variable text segment;
   (c) categorizing the variable text segment parsed in said step (b) into a plurality of tokens; and
   (d) consolidating each alarm message into an alarm table based on the plurality of tokens.

2. The method of claim 1, wherein:
   the plurality of segments include a date segment having an alarm date, a time segment having an alarm time and an element segment having an element identifier; and
   said consolidating step (d) includes consolidating the alarm message based on the alarm date, the alarm time and the element identifier.

3. The method of claim 1, wherein said consolidating step (d) includes:
   (i) grouping the alarm message with an entry from the alarm table when the tokens of the alarm messages match the tokens of the entry within a minimum-match threshold.

4. The method of claim 1, wherein said consolidating step (d) includes:
   (i) grouping the alarm message with an entry from the alarm table when the tokens of the alarm messages match the tokens of the entry within a minimum-match threshold; and
   (ii) incrementing a per element event count associated with the entry when an alarm time associated with the alarm message is within a time threshold of an entry time associated with the entry.

5. The method of claim 1, wherein said consolidating step (d) includes:
   (i) grouping the alarm message with an entry from the alarm table when the tokens of the alarm messages match the tokens of the entry within a minimum-match threshold; and
   (ii) incrementing a source count associated with the entry when the alarm message and the entry are received from different elements of the plurality of elements.

6. The method of claim 1, wherein said consolidating step (d) includes:
   (i) grouping the alarm message with an entry from the alarm table when the tokens of the alarm messages match the tokens of the entry within a minimum-match threshold; and
   (ii) incrementing a message count associated with the entry.

7. The method of claim 1, wherein said categorizing step (c) includes:
   (i) removing a container byte from the leading byte of each token.

8. The method of claim 1, wherein said categorizing step (c) includes:
   (i) removing a container byte from the trailing byte of each token.

9. The method of claim 1, wherein said categorizing step (c) includes:
   (i) categorizing each token having a type from the group of alphabetic, numeric, alphanumeric and other classes.

10. An article of manufacture, comprising:
    a computer-readable medium having stored thereon an alarm table containing a plurality of entries and a plurality of instructions, the plurality of instructions, when executed by the processor, cause the processor to:
    (a) receive a plurality of alarm messages from at least one element of the networked computing environment;
    (b) parse each received alarm message into a plurality of segments including a variable text segment;
    (c) categorize the parsed variable text segment parsed into a plurality of tokens; and
    (d) consolidate each alarm message into an alarm table based on the plurality of tokens.

11. The article of manufacture of claim 10, wherein the plurality of segments include a date segment having an alarm date, a time segment having an alarm time and an element segment having an element identifier; and
    wherein the instructions, when executed by the processor, cause the processor to consolidate each alarm message based on the alarm date, the alarm time and the element identifier.

12. The article of manufacture of claim 10, wherein the instructions, when executed by the processor, cause the processor to consolidate each alarm message by:
    (i) grouping the alarm message with an entry from the alarm table when the tokens of the alarm messages match the tokens of the entry within a minimum-match threshold.

13. The article of manufacture of claim 10, wherein the instructions, when executed by the processor, cause the processor to consolidate each alarm message by:
    (i) grouping the alarm message with an entry from the alarm table when the tokens of the alarm messages match the tokens of the entry within a minimum-match threshold; and
    (ii) incrementing a per entry event count associated with the entry when an alarm time associated with the alarm message is within a time threshold of an entry time associated with the entry.

14. The article of manufacture of claim 10, wherein the instructions, when executed by the processor, cause the processor to consolidate each alarm message by:
    (i) grouping the alarm message with an entry from the alarm table when the tokens of the alarm messages match the tokens of the entry within a minimum-match threshold; and
    (ii) incrementing a source count associated with the entry when the alarm message and the entry are received from different elements of the plurality of elements.

15. The article of manufacture of claim 10, wherein the instructions, when executed by the processor, cause the processor to consolidate each alarm message by:
    (i) grouping the alarm message with an entry from the alarm table when the tokens of the alarm messages match the tokens of the entry within a minimum-match threshold; and
    (ii) incrementing a message count associated with the entry.

16. The article of manufacture of claim 10, wherein the instructions, when executed by the processor, cause the processor to categorize each variable text segment by:
    (i) removing a container byte from the leading byte of each token.

17. The article of manufacture of claim 10, wherein the instructions, when executed by the processor, cause the processor to categorize each variable text segment by:
    (i) removing a container byte from the trailing byte of each token.

18. The article of manufacture of claim 10, wherein the instructions, when executed by the processor, cause the processor to categorize each variable text segment by:
    (i) categorizing each token having a type from the group of alphabetic, numeric, alphanumeric and other classes.

19. An apparatus for analyzing a plurality of alarm messages for a plurality of elements within a networked computing environment, comprising:
    a processor;
    a computer-readable memory storing an alarm table containing a plurality of entries and a plurality of instructions, the plurality of instructions, when executed by the processor, cause the processor to:
    (a) receive a plurality of alarm messages from at least one element of the networked computing environment collection point;
    (b) parse each received alarm message into a plurality of segments including a variable text segment;
    (c) categorize the parsed variable text segment parsed into a plurality of tokens; and
    (d) consolidate each alarm message into an alarm table based on the plurality of tokens;
    a port to be connected to the networked computing environment; and
    a data bus connecting said processor, said computer-readable memory and said port.

* * * * *